United States Patent
Jayasena et al.

(10) Patent No.: US 11,392,508 B2
(45) Date of Patent: Jul. 19, 2022

(54) LIGHTWEIGHT ADDRESS TRANSLATION FOR PAGE MIGRATION AND DUPLICATION

(71) Applicant: ADVANCED MICRO DEVICES, INC., Santa Clara, CA (US)

(72) Inventors: Nuwan Jayasena, Sunnyvale, CA (US); Yasuko Eckert, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/826,061

(22) Filed: Nov. 29, 2017

(65) Prior Publication Data

US 2019/0163644 A1 May 30, 2019

(51) Int. Cl.
*G06F 12/00* (2006.01)
*G06F 12/1027* (2016.01)
*G06F 12/128* (2016.01)
*G06F 12/1009* (2016.01)

(52) U.S. Cl.
CPC ...... *G06F 12/1027* (2013.01); *G06F 12/1009* (2013.01); *G06F 12/128* (2013.01); *G06F 2212/621* (2013.01); *G06F 2212/65* (2013.01); *G06F 2212/68* (2013.01)

(58) Field of Classification Search
CPC ............. G06F 12/1027; G06F 12/1009; G06F 12/128; G06F 2212/621; G06F 2212/65; G06F 2212/68
See application file for complete search history.

(56) References Cited

U.S. PATENT DOCUMENTS

| | | | | |
|---|---|---|---|---|
| 5,897,664 | A * | 4/1999 | Nesheim | G06F 12/0813 711/E12.066 |
| 7,549,035 | B1 * | 6/2009 | Cameron | G06F 12/1045 711/203 |
| 2002/0129115 | A1 * | 9/2002 | Noordergraaf | G06F 12/0813 709/213 |
| 2011/0231593 | A1 * | 9/2011 | Yasufuku | G06F 12/1027 711/3 |
| 2012/0151116 | A1 * | 6/2012 | Tuch | G06F 12/1483 711/6 |
| 2014/0281363 | A1 * | 9/2014 | Tian | G06F 12/10 711/207 |
| 2016/0188486 | A1 * | 6/2016 | Sohi | G06F 3/061 711/118 |
| 2016/0378674 | A1 * | 12/2016 | Cheng | G06F 12/1009 711/206 |
| 2017/0277634 | A1 * | 9/2017 | Basu | G06F 12/084 |

\* cited by examiner

*Primary Examiner* — David Yi
*Assistant Examiner* — Tahilba O Puche (57) ABSTRACT

A first processor is configured to detect migration of a page from a second memory associated with a second processor to a first memory associated with the first processor or to detect duplication of the page in the first memory and the second memory. The first processor implements a translation lookaside buffer (TLB) and the first processor is configured to insert an entry in the TLB in response to the duplication or the migration of the page. The entry maps a virtual address of the page to a physical address in the first memory and the entry is inserted into the TLB without modifying a corresponding entry in a page table that maps the virtual address of the page to a physical address in the second memory. In some cases, a duplicate translation table (DTT) stores a copy of the entry that is accessed in response to a TLB miss.

20 Claims, 5 Drawing Sheets

LIGHTWEIGHT ADDRESS TRANSLATION FOR PAGE MIGRATION AND DUPLICATION

BACKGROUND

Processing systems often implement memory at different locations to facilitate rapid access to the information stored in the memories. For example, the performance of processing systems is enhanced by incorporating specialized processing units (referred to hereinafter as accelerators) to supplement the processing power of conventional central processing units (CPUs). Accelerators typically include locally attached memory that is separate from the memory used by the CPU. Locally attached accelerator memory is an example of non-uniform memory access (NUMA), which generally refers to implementing local memory near each processing unit in a multi-processor system to speed access to the information in the local memory. Other examples of NUMA architectures include local memories associated with processing units in multi-socket systems or processing units that are interconnected by scalable networks. Processing systems also implement hybrid memory systems such as a memory system including dynamic random access memory (DRAM) and nonvolatile random access memory (NVRAM or NVM), which have different access characteristics. For example, NVRAM retains information when power is interrupted to the NVRAM at the cost of longer memory access latencies relative to DRAM. Processing systems further implement high bandwidth interconnects, which may be industry-standards such as Peripheral Component Interconnect Express (PCIe), cache coherent interconnect for accelerators (CCIX), open coherent accelerator processor interface (OpenCAPI), and Gen-Z, or proprietary. These interconnects are used to facilitate the exchange of information among processing units implemented in different locations and can also be used to duplicate or migrate memory pages among local memories of such processing units.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The combination of diverse types of memory that can be disposed proximate the processing units in a processing system and high bandwidth interconnects to convey information between the memories has spurred the development of page duplication or page migration techniques to enhance the performance of the processing system. Duplication or migration of operating system (OS) pages to different physical memory locations enables data to be moved closer to processing units that consume the data. Page duplication or migration increases performance and efficiency of the processing system without requiring application source changes because the application-visible virtual addresses remain unchanged while the physical location changes. This approach is applied in systems with non-uniform memory access (NUMA) characteristics, including those with accelerators and accelerator-attached memory, multiple processor sockets that each maintain their own memory pool, and hybrid memory systems that include fast and slow memories such as DRAM and NVM, which are implemented as in-package memory or off-package memory. In some cases, the duplications or migrations are temporary to provide a copy of data in a location proximate to a processing unit that only accesses the temporary copy of the data during a subset of a computation. In such cases, any updates made to duplicates are reflected back to the original and the duplicates invalidated, and migrations reverted back to the original location when they are no longer required.

Duplicate pages or migrated pages should be accessible using the virtual addresses that were assigned to the source page in order for the duplicate or migrated page to remain transparent to applications in the processing system. Transparency is preserved by modifying page tables that store the virtual-to-physical address translations for the duplicate or migrated pages to indicate physical addresses of the duplicate or migrated pages. However, modifying the page tables requires a resource-intensive operating system (OS) interrupt and a software routine to update the page tables to reflect the duplicated or migrated pages. In some cases, additional overhead is required to invalidate cached entries in translation lookaside buffers (TLBs) in processing units within the processing system. The TLBs are hardware structures associated with processing units that cache a subset of the virtual to physical page mappings contained in page tables. Transparency can also be preserved by introducing an additional level of translation following the translation based on OS page tables. Once the physical address of the source page is determined using the virtual-to-physical address translation based on OS page tables, a subsequent translation is used to generate the physical address of the duplicate or migrated page from the physical address of the source page. However, introducing an additional physical-to-physical address translation in the critical path of every memory access increases the effective memory latency.

FIGS. 1-5 illustrate embodiments of a lightweight address translation mechanism for page duplication and migration. A page is duplicated or migrated between source and destination memory locations in a processing system without updating page tables or introducing additional levels of address translation by inserting an entry into a translation lookaside buffer (TLB) that maps a virtual address of the page to a physical address in a destination memory location without modifying a corresponding entry in a page table that maps the virtual address of the page to a physical address in a source memory location. In some embodiments, the duplicate or migrated page in the destination memory location is invalidated in response to the entry being evicted from the TLB. Some embodiments of the processing unit include multiple processor cores that implement separate TLBs, which can include entries for duplicate or migrated pages that are accessed by the corresponding processor core.

The lifetime of a duplicate or migrated page in the destination memory is extended by implementing a duplicate translation table (DTT) to store copies of the entry that maps the virtual address to the physical address in the destination memory location. The DTT is accessed in response to a TLB miss on the virtual address in response to a memory access. In some embodiments, entries are added to the DTT in response to a translation entry for a duplicated or migrated page being evicted from the TLB. In some embodiments, entries are added to the DTT in response to creating the duplicate or migrated page, along with inserting a corresponding entry into the TLB of the processor core that caused the duplication or migration. One DTT can be shared by multiple TLBs, e.g., in the case of a processing unit that implements multiple processor cores. In embodiments where entries are added to the shared DTT in response to eviction of the entry from a TLB, a miss in a TLB triggers probes of the other TLBs in the same processing unit to see if a proximate duplicate of the page has already been created on behalf of another processor core of the processing unit. The shared DTT is accessed if the probes miss in the other TLBs. In embodiments where entries are added to the shared DTT in response to creating the duplicate or migrated page, a miss in any of the separate TLBs triggers an access to the shared DTT. Alternatively, a separate DTT can be implemented in each of the processor cores.

Some embodiments of the TLB and, if present, the DTT, include physical addresses of the duplicate or migrated page in both the source memory and the destination memory. The physical address of the page in the source memory is used to maintain coherence of caches that utilize physical addresses. For example, in response to a read access from the processor core to a duplicate page, the physical address of the duplicate page is used to perform the read access in the destination memory, but the physical address in the source memory is used to insert the data into the requesting processor core's cache. In some embodiments, a write access to a migrated or duplicated page invalidates the migrated or duplicated page, which includes invalidating the corresponding TLB entries and DTT entries. In other cases, a write access to a migrated or duplicated page triggers a permanent migration of the page to the destination memory. A page table entry for the virtual address of the page is modified to map the virtual address to the physical address of the page in the destination memory and the page in the source memory is invalidated. Thus, the overhead required to update page table entries for duplicated or migrated pages is avoided if no write accesses are directed to the page and deferred until data is written to the page.

Figure 1:
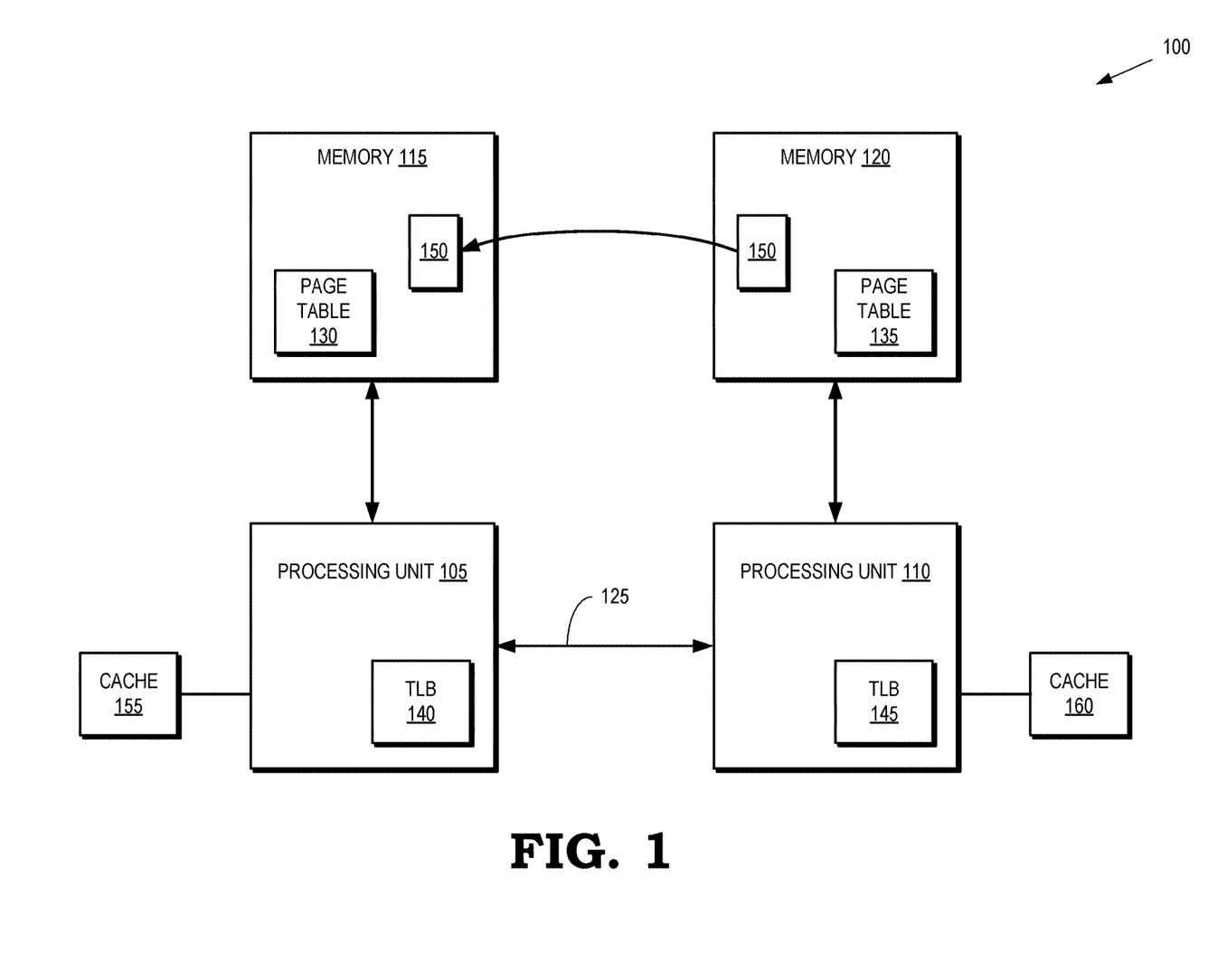
FIG. 1 is a block diagram of a processing system according to some embodiments.

FIG. 1 is a block diagram of a processing system 100 according to some embodiments. The processing system 100 includes processing units 105, 110 that execute instructions stored in corresponding memories 115, 120, which store the instructions and data used by the processing units 105, 110, and results produced by the processing units 105, 110. The processing units 105, 110 are implemented as central processing units (CPUs), graphics processing units (GPUs), specialized processing units or accelerators, application-specific integrated circuits (ASICs), field programmable gate arrays (FPGAs), and the like. Some embodiments of the processing units 105, 110 are a CPU and an accelerator, respectively. However, in other embodiments, the processing units 105, 110 can represent the processing units in a multi-socket system or processing units that are interconnected by scalable networks. The processing units 105, 110 are generically referred to as "processors." However, in embodiments of the processing units 105, 110 that implement multiple processor cores, the processor cores are referred to as the "processors" in the processing units 105, 110, as discussed below.

The memories 115, 120 are implemented as locally attached memories according to non-uniform memory access (NUMA) principles. For example, the processing unit 105 accesses the memory 115 directly on the basis of virtual addresses that are mapped to physical addresses in the memory 115. For another example, the processing unit 110 accesses the memory 120 directly on the basis of virtual addresses that are mapped to the physical addresses in the memory 120. Some embodiments of the processing units 105, 110 are able to access information stored in the non-local memories. However, the processing units 105, 110 are not able to directly access the non-local memories. Instead, the processing units 105, 110 transmit requests to the other processing unit over an interface 125. For example, memory access requests from the processing unit 105 to the memory 120 pass through the processing unit 110 via the interface 125. For another example, memory access requests from the processing unit 110 to the memory 115 pass through the processing unit 105 via the interface 125.

Translations of virtual addresses to physical addresses are stored in page tables 130, 135. Each process that is executing in the processing system 100 has a corresponding page table. The page table for a process translates the virtual addresses that are being used by the process to physical addresses in one or more of the memories 115, 120. In some embodiments, the entirety of the page table for a process is stored in one of the memories 115, 120. For example, if a process is executing on the processing unit 105, the page table 130 maps virtual addresses used by the process to physical addresses in one or more of the memories 115, 120. In some embodiments, the page table for a process is stored across a plurality of memories 115, 120. For example, if a process is executing on the processing unit 105, a portion of the page table content is stored in the page table 130 while the remaining portion of the page table content is stored in the page table 135. Both portions of the page table 130, 135 are used to provide mapping from virtual addresses used by the process to physical addresses in one or more of the memories 115, 120. The page tables 130, 135 are not constrained to map virtual addresses used by a process executing on one of the processing units 105, 110 to physical addresses in a corresponding one of the memories 115, 120. For example, the page table for a process executing on one of the processing units 105, 110 may map the virtual address space of the process to physical addresses in both of the memories 115, 120. If multiple processes are executing concurrently on one or more of the processing units 105, 110, the processing system 100 generates and maintains multiple page tables to map the virtual address spaces of the concurrent processes to physical addresses in one or more of the memories 115, 120.

Translations that are frequently used by the processing units 105, 110 are stored in translation lookaside buffers (TLBs) 140, 145 that are implemented in the corresponding processing units 105, 110. The TLBs 140, 145 are used to cache frequently requested virtual-to-physical address translations. Entries including frequently used address translations are written from the page tables 130, 135 into the corresponding TLBs 140, 145. The processing units 105, 110 are therefore able to retrieve the address translations from the TLBs 140, 145 without the overhead of searching for the translation in the page tables 130, 135. Entries are evicted from the TLBs 140, 145 to make room for new entries according to a TLB replacement policy.

Pages are migrated between the memories 115, 120 or duplicated in the memories 115, 120 by conveying copies of the pages over the interface 125. In the illustrated embodiment, a page 150 is copied from the memory 120 to the memory 115. The page 150 is duplicated if the page 150 remains in the memory 120 after the operation. In some cases, the page 150 is migrated if the page 150 is removed from the memory 120 at some future point. In embodiments where a write to the migrated page 150 triggers the invalidation of the page in the destination memory 115, retaining the original copy in memory 120 avoids the need to copy the page 150 back to the original location. This behavior is desirable when migrations are expected to be temporary. In embodiments where a write to the migrated page 150 causes a permanent migration of the page 150 to the memory 115, the overhead of the permanent migration is deferred until a write occurs, at which point the original copy of the page 150 is removed from memory 120 and its page table entry is updated to refer to the new physical page 150 in the destination memory 115. Once a migration is made permanent, the physical page 150 remains in the destination memory 115 regardless of whether a corresponding TLB entry is available or not.

In response to migration or duplication of pages, the processing units 105, 110 insert entries into the corresponding TLBs 140, 145 to map a virtual address of the migrated or duplicated page to a physical address in the destination memory location without modifying a corresponding entry in one or more of the page tables 130, 135. For example, processing unit 105 adds an entry to the TLB 140 that maps a virtual address of the page 150 to the physical address of the page 150 in the memory 115. The processing unit 105 does not update the page table 135 and so a corresponding entry in the page table 135 continues to map the virtual address of the page 150 to the physical address of the page 150 in the memory 120. In addition, TLB 145 of processing unit 110 may contain a copy of the page table 135 entry that maps the virtual address of the page 150 to the physical address of the page 150 in the memory 120. If the entry is evicted from the TLB 140, the processing unit 105 invalidates the copy of the page 150 in the memory 115.

Some embodiments of the processing units 105, 110 are associated with one or more caches 155, 160 that are used to cache data or instructions that are frequently used by the processing units 105, 110. Although the caches 155, 160 are shown as external to the corresponding processing units 105, 110, some embodiments of the processing units 105, 110 implement internal caches. Furthermore, some embodiments of the caches 155, 160 are part of a cache hierarchy.

Some embodiments of the processing units 105, 110 use physical addresses to locate data in their caches 155, 160. Therefore, the use of duplicate or migrated pages can cause the presence of multiple copies of the same data in the caches 155, 160 using different physical addresses, which are referred to herein as "physical synonyms." The presence of the physical synonyms in the caches may or may not be a problem depending on the other aspects of the system. For example, if only read-only pages are (temporarily) duplicated or migrated, no cache coherence traffic is anticipated and physical synonyms are tolerable. Similarly, if virtually-tagged caches are used, physical synonyms are not a concern as the same virtual addresses continue to be used to refer to the duplicated or migrated pages as well as the corresponding original pages.

In systems that use physical addresses to locate cache data, cache coherence is maintained on the basis of information stored in the TLBs 140, 145. Some embodiments of the TLB, 140, 145 include physical addresses of the duplicate or migrated page in both the source memory and the destination memory. For example, the entry in the TLB 140 for the page 150 can include a virtual address of the page 150, a physical address of the page 150 in the memory 115, and a physical address of the page 150 in the memory 120. The physical address of the duplicated or migrated page in the source memory is used to maintain coherence of caches that utilize physical addresses. For example, in response to a read access to the page 150, the physical address of the page 150 in the memory 115 is used to perform the read access in the memory 115 and the physical address of the page 150 in the memory 120 is used to insert data into the cache 155.

Maintaining a consistent view of memory throughout the processing system 100 requires additional operations if the processing units 105, 110 support migration or duplication of writable pages. In some embodiments, a write access to the page 150 by either of the processing units 105, 110 (or any other processing unit) invalidates the copy of the page 150 in the memory 115, which includes invalidating the corresponding entry in the TLB 140, and the write is performed to the original page 150 in memory 120. The invalidation is performed in response to the store instruction for the write or cache coherence requests arising from the write in hardware or in software by triggering a software exception on a write to a duplicated page. Cached data does not need to be invalidated in response to invalidation of duplicate or migrated pages because the physical memory address in the source memory 120 is used for caching, as discussed herein. In other embodiments, a write access to the page 150 by processing unit 105 triggers a permanent migration of the page 150 to the memory 115. The existing entry in one or more of the page tables 130, 135 for the virtual address of page 150 is modified to map the virtual address of the page 150 to the physical address of the page 150 in the memory 115. The page 150 in the memory 120 is invalidated. In some cases, permanent migration is triggered by setting the duplicated or migrated page as a read-only page and generating a software interrupt on a write.

A TLB shootdown is used to invalidate address translations in the TLBs 140, 145. As discussed herein, duplicate copies of a page and the corresponding address translations must be invalidated in response to the translation entry for the original page being invalidated. Thus, the TLBs 140, 145 are searched in response to a TLB shootdown using the virtual page address or the original physical page address and not the physical page address of the duplicate or migrated page. Entries in the TLBs 140, 145 include the physical address of the original page and the physical address of the migrated or duplicated page, which supports searching the TLBs 140, 145 using the original physical address in response to a TLB shootdown.

Figure 2:
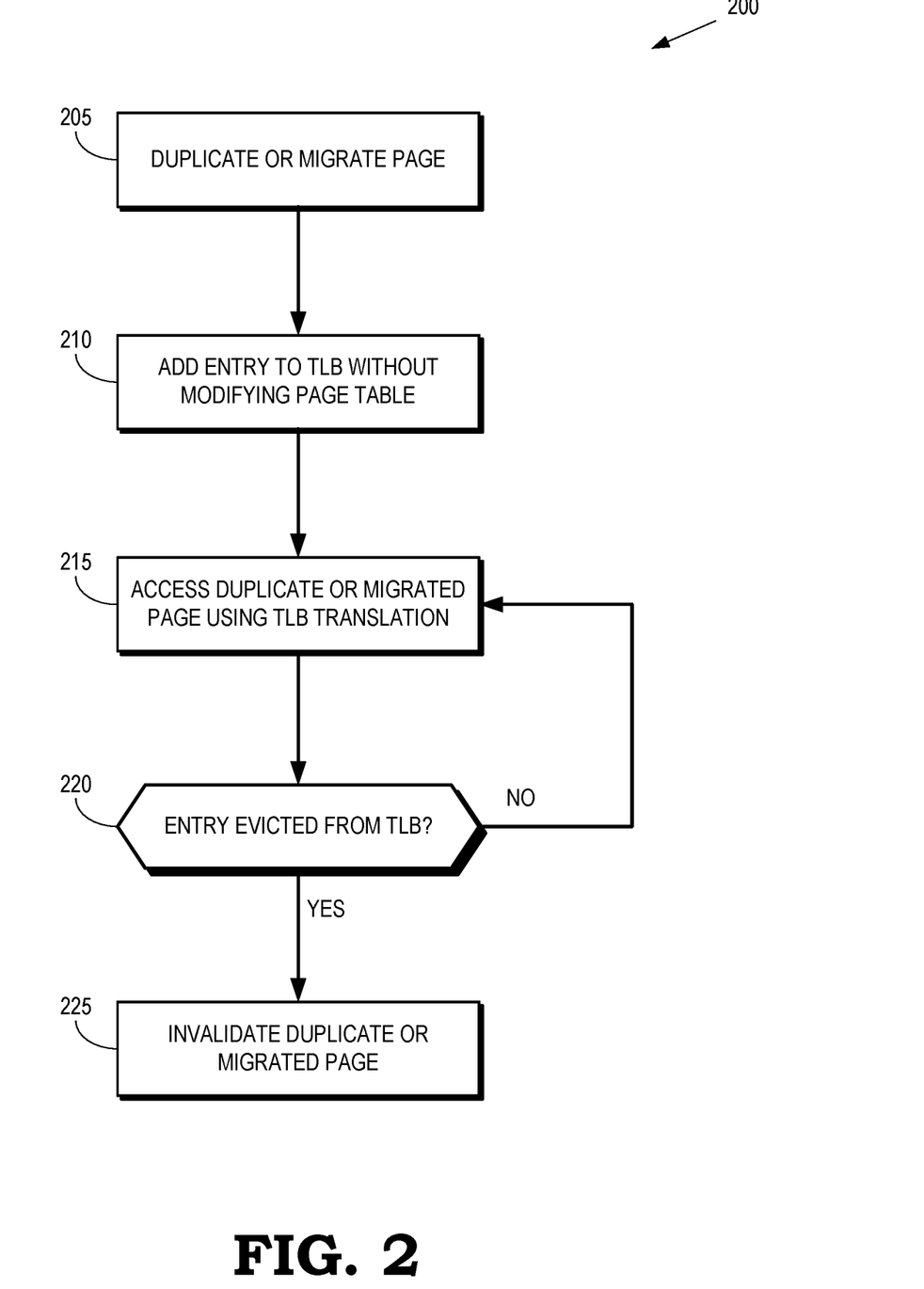
FIG. 2 is a flow diagram of a method of lightweight address translation for duplicated or migrated pages according to some embodiments.

FIG. 2 is a flow diagram of a method 200 of lightweight address translation for duplicated or migrated pages according to some embodiments. The method 200 is implemented in some embodiments of the processing system 100 shown in FIG. 1.

At block 205, a page is migrated or duplicated from a source memory to a destination memory. The source memory is associated with a source processor and the destination memory is associated with a destination processor. The source memory represents some embodiments of the memory 120 and the source processor represents some embodiments of the processing unit 110. The destination memory represents some embodiments of the memory 115 and the destination processor represents some embodiments of the processing unit 105.

At block 210, an entry including a translation of a virtual address of the page to a physical address in the destination memory is added to a TLB implemented in the destination processor. For example, the destination processor can initiate duplication or migration of the page and generate the entry in the TLB in response to detecting conditions suitable for the duplication or migration. Techniques for determining when to initiate duplication or migration of the page are known in the art and, in the interest of clarity, are not discussed in detail herein. A page table including a translation of the virtual address of the page to a physical address in the source memory is not modified and so the page table retains the mapping of the virtual address to the physical address in the source memory. At this point, the TLB for the destination processor maps the virtual address to the physical address in the destination memory and the page table maps the virtual address to the physical address in the source memory.

At block 215, the destination processor is able to access the duplicate or migrated page using the virtual-to-physical address translation in the entry of the TLB. For example, the destination processor accesses the entry in the TLB in response to a memory access including the virtual address of the page. The destination processor uses the address translation from the entry in the TLB to generate the physical address of the page in the destination memory and then perform the memory access using the physical address.

At decision block 220, the destination processor determines whether the entry has been evicted from the TLB. As long as the entry remains in the TLB, the destination processor continues to use the entry to generate address translations in response to memory access requests. In response to the entry being evicted from the TLB, e.g., due to capacity pressure on the TLB, the method 200 flows to block 225.

At block 225, the destination processor invalidates the duplicate or migrated page in the destination memory. As discussed herein, when a write to the migrated or duplicated page triggers the invalidation of the page in the destination memory, retaining the original copy in the source memory avoids the need to copy the page back to the source memory. This behavior is desirable when migrations are expected to be temporary. In embodiments where a write to the migrated or duplicated page causes a permanent migration of the page the destination memory, the overhead of the permanent migration is deferred until a write occurs, at which point the original copy of the page is removed from source memory and its page table entry is updated to refer to the new physical page in the destination memory. Permanent migrations also include updating caches in the system so that the new physical addresses are used instead of the old ones that mapped to the source memory, invalidating the old physical page address for the source memory in the destination TLB, and invalidating the corresponding entry in the source TLB, if the source TLB is still present. In some cases, a TLB shootdown is used to invalidate the mapping to the original physical page in all TLBs throughout the system. Once a migration is made permanent, the physical page remains in the destination memory regardless of whether a corresponding TLB entry is available or not.

Figure 3:
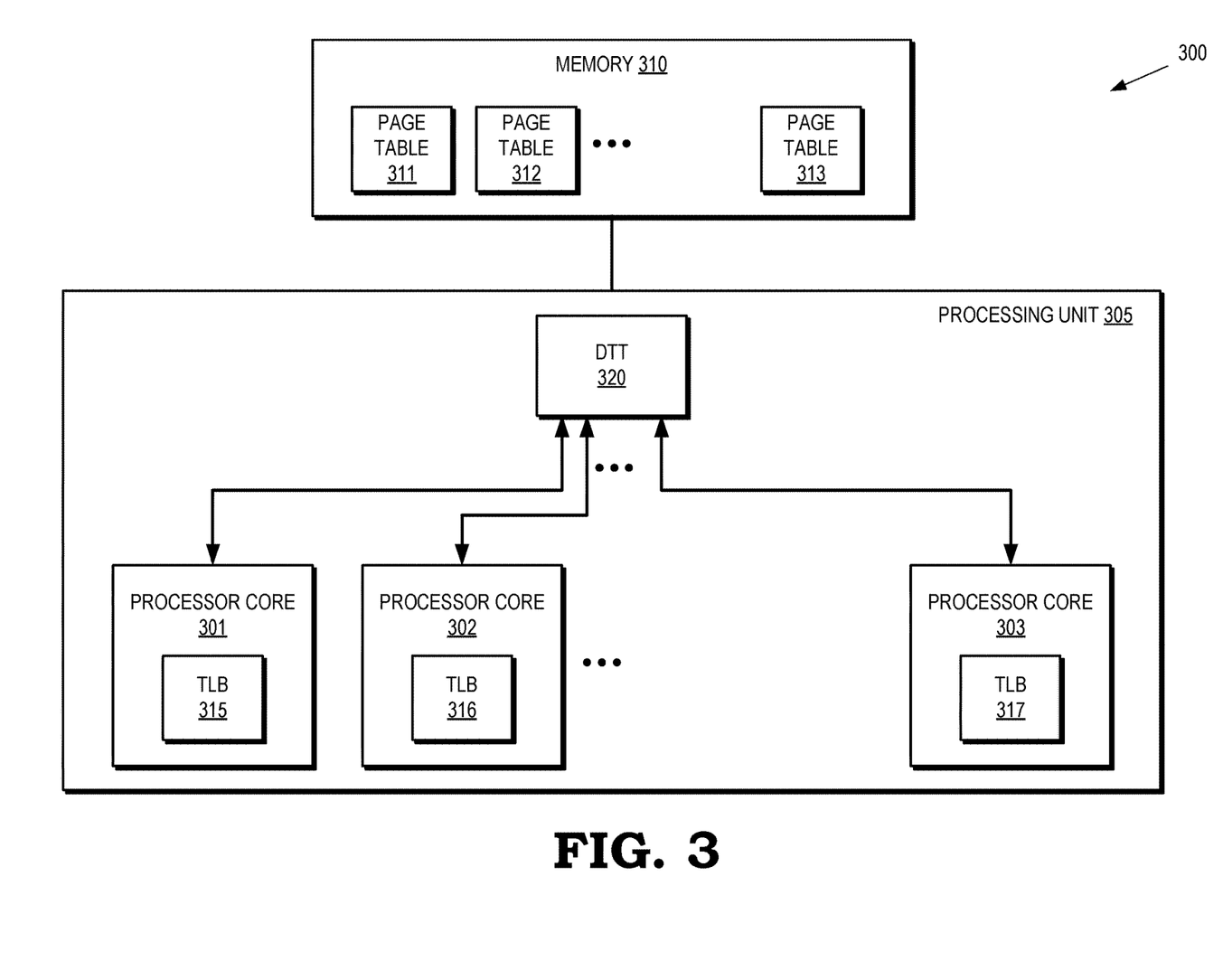
FIG. 3 is a block diagram of a processing unit according to some embodiments.

FIG. 3 is a block diagram of a processing system 300 according to some embodiments. The processing system 300 includes a processing unit 305 that is used to implement some embodiments of the processing units 105, 110 shown in FIG. 1. The processing unit 305 includes processor cores 301, 302, 303, which are referred to herein as "the processor cores 301-303." Processor cores are also referred to as processors in some instances. The processor cores 301-303 are configured to execute instructions concurrently or in parallel. The processor cores 301-303 execute instructions stored in a memory 310 that is associated with the processing unit 305 and shared by the processor cores 301-303. The memory 310 stores instructions for execution by the processor cores 301-303, data used by the processor cores 301-303, and results produced by the processor cores 301-303.

Virtual-to-physical address translations used by the processor cores 301-303 to access locations in the memory 310 (or other memories in the processing system 300) are stored in page tables 311, 312, 313 which are collectively referred to herein as "the page tables 311-313." As discussed herein, the page tables 311-313 are allocated to different processes executing on one or more of the processor cores 301-303. Page tables for other processes executing on one or more of the processor core 301-303 can also be stored in other memories or split between the memory 310 and the other memories. Translations that are frequently used by the processor cores 301-303 are stored in translation lookaside buffers (TLBs) 315, 316, 317 that are implemented in the corresponding processor cores 301-303. Entries including frequently used address translations are written from the page tables 311-313 into the corresponding TLBs 315-317. As discussed herein, entries are added to the TLBs 315-317 in response to the corresponding processor cores 301-303 detecting migration or duplication of a page in the memory 310 or other memories associated with the processing system 300. The page tables 311-313 are not updated in response to detecting the migration or the duplication.

The duplicate or migrated page is invalidated in response to eviction of the entry from the TLBs 315-317, as discussed herein. The lifetime of a duplicated or migrated page is therefore limited to the lifetime of an entry in the TLBs 315-317. Duplication or migration of a memory page requires a significant amount of overhead and the cost of the duplication or migration is not always fully amortized over the entry lifetime. The lifetime of the duplicated or migrated page is extended by introducing an additional hardware table that is referred to herein as a duplicate translation table (DTT) 320. Although the DTT 320 is depicted as part of the hardware used to implement the processing unit 305, some embodiments of the DTT 320 are implemented as a separate piece of hardware external to the processing unit 305.

The DTT 320 stores duplicates of the address translations that are stored in the TLBs 315-317 in response to detecting migrations or duplications. In some embodiments, entries are added to the DTT 320 in response to a translation entry for a duplicated or migrated page being evicted from one of the TLBs 315-317. In some embodiments, entries are added to the DTT 320 in response to creating the duplicate or migrated page, along with inserting a corresponding entry into the TLB 315-317 of the processor core 301-303 that caused the duplication or migration. The DTT 320 shown in FIG. 3 is shared by the TLBs 315-317. However, in some embodiments a separate DTT is implemented for each of the processor cores 301-303.

The DTT 320 is accessed in response to different sequences of events associated with a TLB miss depending on its configuration. In embodiments where entries are added to the shared DTT 320 in response to eviction of the entry from a TLB 315-317, a miss in a TLB 315-317 triggers probes of the other TLBs 315-317 to see if a proximate duplicate of the page has already been created on behalf of another processor core 301-303. For example, a miss in the TLB 315 triggers probes of the TLBs 316, 317. The DTT 320 is accessed if the probes miss in the other TLBs 316, 317. In embodiments where entries are added to the DTT 320 in response to creating the duplicate or migrated page, a miss in any of the TLBs 315-317 triggers an access to the DTT 320. Thus, on a TLB miss, the DTT 320 is searched before walking the page tables 311-313 to obtain a translation. A local duplicate of the translation is therefore located before attempting an access to a remote memory. The DTT 320 is not on the critical path of the typical memory access because it is only accessed on a TLB miss.

Entries in the DTT 320 are evicted based on a replacement policy, such as evicting the least recently used entry in the DTT 320 in response to addition of a new entry in the DTT 320 when all entries in the DTT 320 are full. Entries in the DTT 320 can also be invalidated in response to other conditions. For example, in some cases a write to a migrated or duplicated page invalidates all duplicates of the page, which requires invalidating entries in the DTT 320 corresponding to the duplicate or migrated page. Entries in the DTT 320 are also invalidated in response to a TLB shootdown in the same manner that entries in a TLB are invalidated in response to the TLB shootdown, as discussed herein.

In some embodiments, the DTT 320 is selectively accessed to improve the utilization of the DTT 320. For example, in response to evicting an entry from one of the TLBs 315-317, duplicated or migrated pages that have been frequently accessed allocate their page translations into the DTT 320 (as described above) and address translations for infrequently-accessed duplicated or migrated pages are not added to the DTT 320. The duplicated or migrated pages are invalidated if their address translations are evicted from all TLBs 315-317 and are not added to the DTT 320. The frequency of access is determined using per-page access statistics, which are stored in the corresponding TLB 315-317 or in a separate hardware structure. In some embodiments, the access frequency is represented by a counter that is incremented in response to accessing the corresponding page. Some embodiments of the counter are partially or fully cleared periodically (or at other time intervals) to avoid strong biases towards history.

Some embodiments of the processor cores 301-303 share the memory 310. The processor cores 301-303 therefore benefit by accessing duplicate or migrated pages in the memory 310 associated with any of the processor cores 301-303. As discussed above, access to duplicate or migrated pages created by other processor cores 301-303 is supported in one of two ways:

1) When a TLB miss occurs in one of the TLBs 315-317, the other TLBs 315-317 are probed for local duplicates of the requested page before searching the DTT 320 or, if the memory access misses in the DTT 320, the page tables 311-313. Duplicates of the requested pages in the memory 310 are therefore located before searching the DTT 320 or walking the page table 311-313 if the page is stored in another memory.

2) Whenever a duplicate is created in the memory 310, the corresponding address translation is inserted in to the DTT 320 in response to creating the duplicate or migrated page (and not at TLB eviction). This avoids the need to probe TLBs 315-317 of the other processor cores 301-303.

Some embodiments of the processor cores 301-303 are configured to broadcast new address translations to all the TLBs 315-317 in the processing unit 300 when a new duplicate is created. Broadcasting the address translations is used to notify the other TLBs 315-317 in case the corresponding processor cores 301-303 are accessing the same page from remote memory. Alternatively, the processor cores 301-303 are allowed to access remote memory until they satisfy criteria necessitating a local duplicate. At that point, the processor cores 301-303 probe other TLBs 315-317 or search the DTT 320 (depending on which of the two options listed above is implemented in the processing unit 300) to find any existing copies of the page. The processor core 301-303 create a duplicate only if the processor core 301-303 is unable to locate a previously duplicated or migrated copy of the page.

Figure 4:
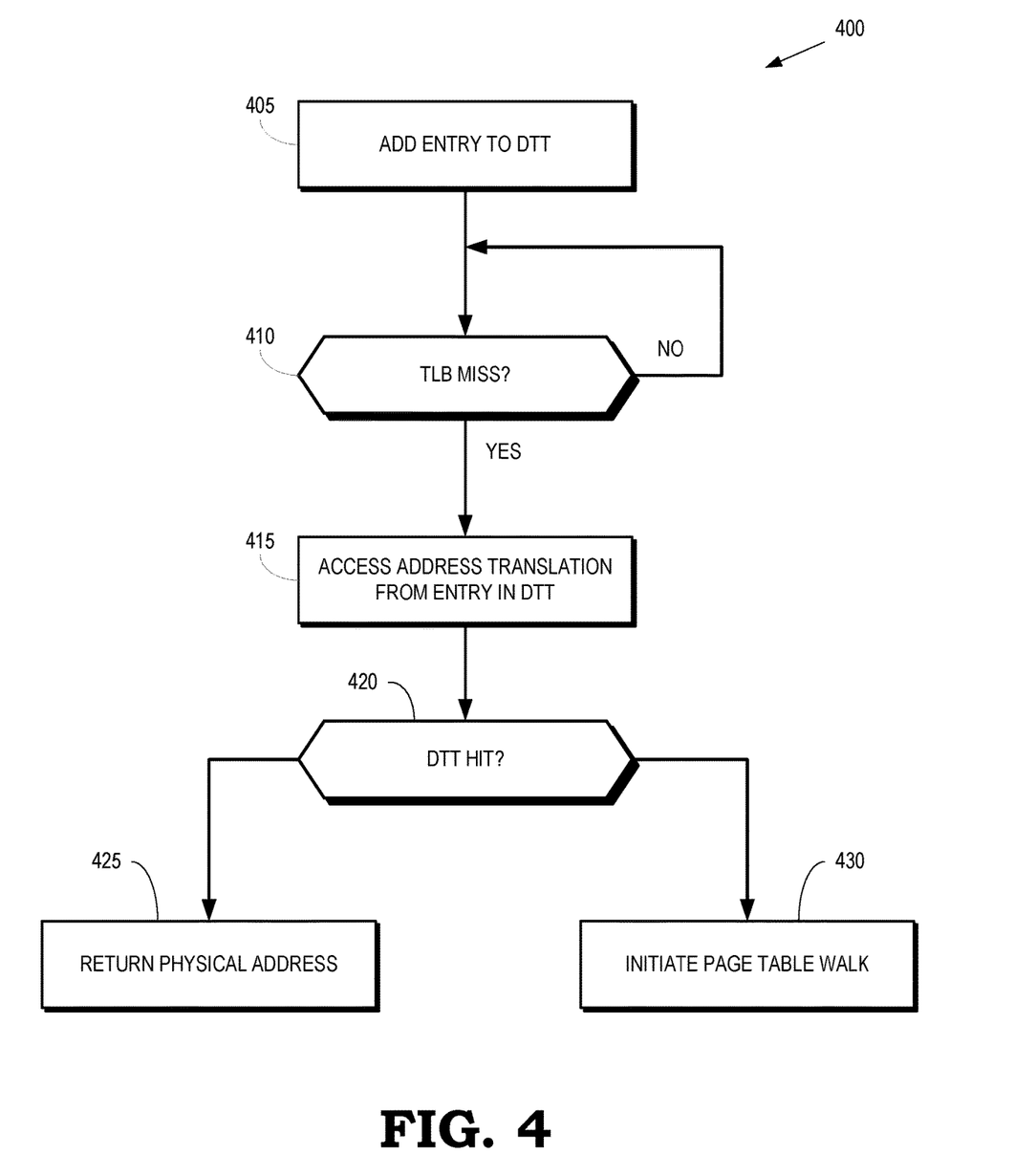
FIG. 4 is a flow diagram of a method of implementing a duplicate translation table (DTT) according to some embodiments.

FIG. 4 is a flow diagram of a method 400 of implementing a DTT according to some embodiments. The method 400 is implemented in some embodiments of the processor cores 301-303 in the processing unit 300 shown in FIG. 3.

At block 405, a processor core adds an entry to the DTT. As discussed herein, in some embodiments entries are added to the DTT in response to a translation entry for a duplicated or migrated page being evicted from a TLB. In some embodiments, entries are added to the DTT in response to creating the duplicate or migrated page, along with inserting a corresponding entry into the TLB of the processor core that caused the duplication or migration.

At decision block 410, the processor core determines whether there has been a TLB miss in its corresponding TLB. As long as the processor core has not detected a TLB miss, the processor core continues to monitor the TLB. In response to detecting a TLB miss, the method 400 flows to block 415.

At block 415, the processor core accesses an address translation from an entry in the DTT. For example, the processor core can transmit an access request including a virtual address.

At decision block 420, the processor core determines whether the access request hits in the DTT. If the access request hits, the method 400 flows to block 425 and the DTT returns a physical address that is determined using a virtual-to-physical address translation in an entry of the DTT. If the access request misses, the method 400 flows to block 430 and the access request is used to initiate a table walk of a corresponding page table to determine the virtual-to-physical address translation.

Figure 5:
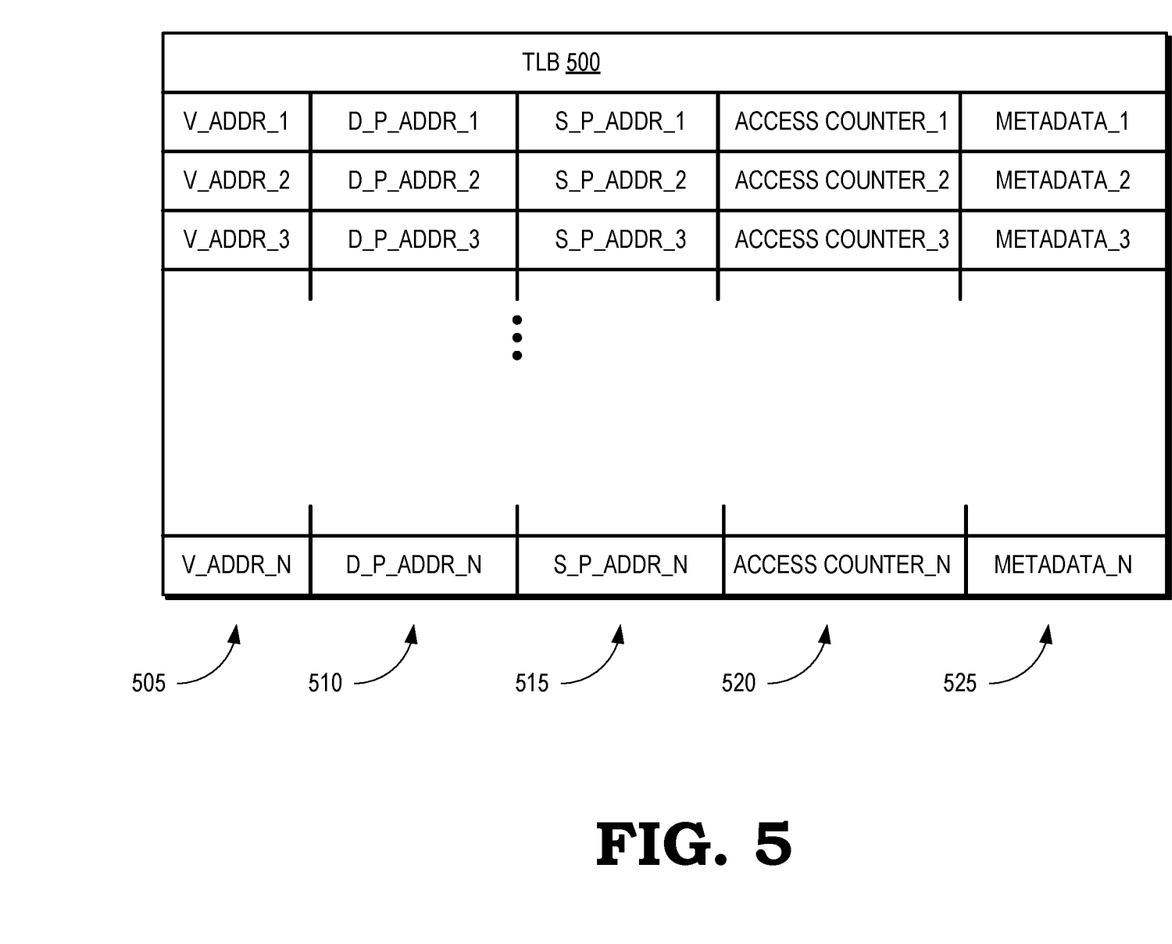
FIG. 5 is a block diagram of a translation lookaside buffer (TLB) according to some embodiments.

FIG. 5 is a block diagram of a translation lookaside buffer (TLB) 500 according to some embodiments. The TLB 500 is used to implement some embodiments of the TLBs 140, 145 shown in FIG. 1 and some embodiments of the TLBs 315-317 shown in FIG. 3. The rows of the TLB 500 are entries that include address translation information for a corresponding memory page. The entries in the TLB 500 that are shown in FIG. 5 are entries that are added to the TLB 500 in response to a corresponding processor core detecting migration of a page from a source memory to a destination memory or duplication of the page in the source memory and the destination memory. Some embodiments of the TLB 500 also include other entries that are added to the TLB 500 for other purposes. The other entries may use different formats and include more or less information.

The TLB 500 includes a first column 505 to store the virtual addresses of the entries (e.g., V_ADDR_1) and a second column 510 to store the physical addresses of the entries in the destination memory (e.g., D_P_ADDR_1). The values in the first column 505 and the second column 510 therefore represent a mapping of the virtual address to the physical address. The third column 515 stores the physical addresses of the entries in the source memory (e.g., S_P_ADDR_1). As discussed herein, information in the third column 515 is used to implement cache coherence techniques in some embodiments. The third column 515 is optional and is not implemented in all embodiments of the TLB 500. The fourth column 520 stores an access counter (e.g., ACCESS COUNTER_1) that is incremented in response to a TLB hit to the corresponding entry. As discussed herein, the information in the fourth column 520 is used to determine a frequency of access of the corresponding entry. The fourth column 520 is optional and is not implemented in all embodiments of the TLB 500.

Some embodiments of the TLB 500 include a fifth column 525 to store metadata. For example, entries in the fifth column 525 are used to store read/write permissions associated with a corresponding page, information indicating whether the page has been written or not, and the like.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising: detecting, at a first processor associated with a first memory, a migration of a page to the first memory from a second memory associated with a second processor or a duplication of a page in the first memory and the second memory;
   inserting an entry into a translation lookaside buffer (TLB) in the first processor in response to the duplication of the page or the migration of the page, wherein the entry maps a virtual address of the duplicated page or a virtual address of the migrated page to a physical address, the physical address being associated with the first memory, and wherein the entry is inserted into the TLB without modifying a corresponding entry in a page table that maps the virtual address of the duplicated page or the migrated page to a physical address associated with the second memory;
   and in response to a miss in the TLB resulting from an access that targets a migrated or duplicated page, accessing a duplicate translation table (DTT) to determine a physical address for the access,
   wherein the DTT is configured to store copies of TLB entries that map virtual addresses of duplicated pages or virtual addresses of migrated pages to the respective physical addresses in response to detecting page migrations or duplications.

2. The method of claim 1, further comprising: evicting the entry from the TLB; and invalidating the duplicated page or the migrated page in the first memory in response to evicting the entry.

3. The method of claim 1, further comprising: storing a copy of the entry in the DTT; and accessing the copy of the entry from the DTT in response to a memory access request missing in the TLB.

4. The method of claim 3, wherein storing the copy of the entry in the DTT comprises storing the copy of the entry in the DTT in response to the entry being evicted from the TLB.

5. The method of claim 4, wherein the TLB is one of a plurality of TLBs within a processing unit, and wherein the DTT is shared by the plurality of TLBs, the method further comprising:
in response to a miss in the TLB, probing the other ones of the plurality of TLBs to determine whether a duplicate of the duplicated page or the migrated page is available in the first memory associated with the processing unit; and
accessing the copy of the entry from the DTT in response to the probes missing in the other ones of the plurality of TLBs.

6. The method of claim 3, wherein storing the copy of the entry in the DTT comprises storing the copy of the entry in the DTT in response to the duplication or the migration of the page.

7. The method of claim 6, wherein: the TLB is one of a plurality of TLBs; the DTT is shared by the plurality of TLBs; and accessing the copy of the entry in the DTT comprises accessing the copy of the entry in the DTT in response to a miss in any one of the plurality of TLBs.

8. The method of claim 1, further comprising:
in response to a read access to the page, performing the read access in the first memory based on a first physical address of the duplicated page or the migrated page in the first memory and inserting data into a cache based on a second physical address of the duplicated page or the migrated page in the second memory.

9. The method of claim 1, further comprising:
in response to a write access to the duplicated page or the migrated page, invalidating the duplicated page or the migrated page in the first memory and invalidating the entry in the TLB.

10. The method of claim 1, further comprising:
in response to a write access to the duplicated page or the migrated page, modifying a page table entry to map the virtual address to a first physical address of the duplicated page or the migrated page, the first physical address being associated with the first memory and invalidating the duplicated page or the migrated page in the second memory.

11. An apparatus comprising: a first processor associated with a first memory, wherein the first processor is configured to detect a migration of a page to the first memory from a second memory associated with a second processor or a duplication of a page in the first memory and the second memory, and wherein:
the first processor implements a translation lookaside buffer (TLB); the first processor is configured to insert an entry in the TLB in response to the duplication or the migration of the page; the entry maps a virtual address of the duplicated page or a virtual address of the migrated page to a physical address, the physical address being associated with the first memory; and the entry is inserted into the TLB without modifying a corresponding entry in a page table that maps the virtual address of the duplicated page or the migrated page to a physical address associated with the second memory; and
in response to a miss in the TLB resulting from an access that targets a migrated or duplicated page, the first processor accesses a duplicate translation table (DTT) to determine a physical address for the access,
wherein the DTT is configured to store copies of TLB entries that map virtual addresses of duplicated pages or virtual addresses of migrated pages to the respective physical addresses in response to detecting page migrations or duplications.

12. The apparatus of claim 11, wherein the first processor is configured to:
evict the entry from the TLB; and
invalidate the duplicated page or the migrated page in the first memory in response to evicting the entry.

13. The apparatus of claim 11, further comprising: the DTT, wherein the first processor is configured to: store a copy of the entry in the DTT, and access the copy of the entry from the DTT in response to a memory access request missing in the TLB.

14. The apparatus of claim 13, wherein the first processor is configured to store the copy of the entry in the DTT in response to the entry being evicted from the TLB.

15. The apparatus of claim 11, further comprising:
a cache that is used to cache information for the first processor, and
wherein, in response to a read access to the page, the first processor performs the read access in the first memory based on a first physical address of the duplicated page or the migrated page in the first memory and inserts data into the cache based on a second physical address of the duplicated page or the migrated page in the second memory.

16. The apparatus of claim 15, wherein:
in response to a write access to the duplicated page or the migrated page, the first processor invalidates the duplicated page or the migrated page in the first memory and invalidates the entry in the TLB.

17. The apparatus of claim 15, wherein:
in response to a write access to the duplicated page or the migrated page, the first processor modifies a page table entry to map the virtual address to a first physical address of the duplicated page or the migrated page, the first physical address being associated with the first memory and invalidates the duplicate page or the migrated page in the second memory.

18. A processing unit comprising: a first processor that implements a first translation lookaside buffer (TLB); and a second processor that implements a second TLB, wherein the first and second processors share a first memory, and wherein the first processor is configured to: detect a migration of a page to the first memory from a second memory or a duplication of a page in the first and second memories; and insert an entry into the first TLB in response to the duplication of the page or the migration of the page, wherein the entry maps a virtual address of the duplicated page or the migrated page to a physical address, the physical address being associated with the first memory, and wherein the entry is inserted into the first TLB without modifying a corresponding entry in a page table that maps the virtual address of the duplicated page or the migrated page to a physical address associated with the second memory; and a duplicate translation table (DTT) that is shared by the first and second TLBs, wherein the DTT is configured to store copies of TLB entries that map virtual addresses of duplicated pages or virtual addresses of migrated pages to the respective physical addresses in response to detecting page migrations or duplications, and wherein the first processor is configured to: store a copy of the entry of the first TLB that maps the virtual address of the duplicated page or the migrated page to the physical address in the DTT, and access the copy of the entry of the first TLB from the DTT in response to a memory access request missing in the first TLB.

19. The processing unit of claim 18, wherein the first processor is configured to:

store the copy of the entry of the of the first TLB in the DTT in response to the entry of the first TLB being evicted from the first TLB; and in response to a miss in the TLB:

probe the second TLB to determine whether a duplicate of the duplicated page or the migrated page is available in the second memory; and access the copy of the entry of the first TLB from the DTT in response to the probe missing in the second TLB.

20. The processing unit of claim 18, wherein the first processor is configured to store the copy of the entry of the first TLB in the DTT in response to the duplication or the migration of the page.

\* \* \* \* \*